J. S. Hooten,
Filter.
No. 105,209. Patented July 12, 1870.
Figure 1 —
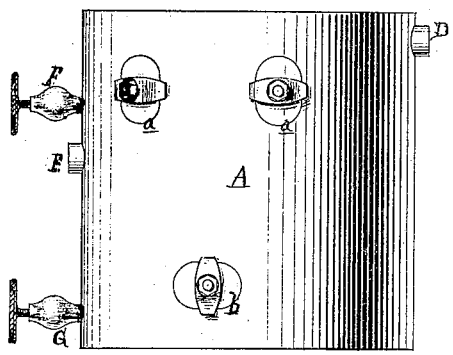
Figure 2 —
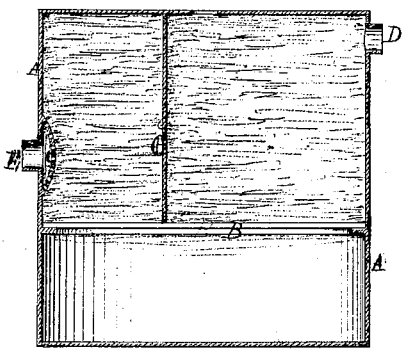
Figure 3 —
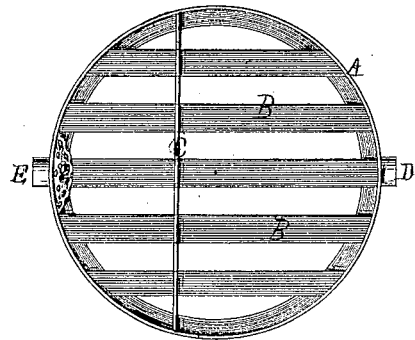
ATTEST:
James Thierry
H. S. Sprague,
INVENTOR:
J. S. Hooten
Per Attorney
Thos. S. Sprague

United States Patent Office.

JAMES S. HOOTON, OF NEW CARLISLE, INDIANA.

Letters Patent No. 105,209, dated July 12, 1870.

IMPROVEMENT IN FEED-WATER FILTERS.

The Schedule referred to in these Letters Patent and making part of the same.

*To whom it may concern:*

Be it known that I, JAMES. S. HOOTON, of New Carlisle, in the county of St. Joseph and State of Indiana, have invented a new and useful Improvement in Feed-water Filter and Purifier; and I do declare that the following is a true and accurate description thereof, reference being had to the accompanying drawing and to the letters of reference marked thereon and being a part of this specification, in which—

Figure 1 is an elevation of my filter-case;

Figure 2 is a vertical section; and

Figure 3 is a plan of the same with the top removed.

Similar letters of reference indicate corresponding parts in each figure.

The nature of this invention relates to the construction of a device for filtering and purifying the feed-water for steam-boilers, to be used in connection with any suitable feed-water heater, and is more especially designed as an improvement on that patented by me March 3, 1868.

It consists in so constructing the filter-case with a vertical partition, that the water entering at or near the top on one side, percolates down through the filtering material, which is supported by a suitable grating, parting with any impurities in its passage, and thence up through similar filtering material on the other side of the partition, which eliminates any remaining trace of impurity in the feed-water before entering the eduction-pipe, and in arranging the devices for these purposes, and the various hand-holes for filling or cleaning the filter, and the cocks for conducting away the overflow and for emptying the filter, in a novel manner.

In the drawing—

A represents the casing of my filter, closed at the top and bottom, and having in its lower part a grating, B.

C is a vertical partition, extending from the top down to the grate, dividing the casing into two chambers of unequal capacity, which are filled with hay or other suitable filtering material, introduced through the hand-holes *a*, which are closed by suitable plates.

D is the induction-pipe, through which the feed-water from the heater enters the filter, percolating down through the filtering material to the space under the grating. In its passage, the larger part of the impurities held in suspension is taken up by the filtering material, and should it loosen any of the impurities previously deposited, they will settle of their own gravity in the chamber below the grating, whence they are readily removed through the hand-hole *b*. The water then rises through the material in the smaller chamber, which eliminates any remaining trace of impurity in the water, which is then discharged through the eduction-pipe E, leading to the force-pump. The opening to the eduction-pipe is covered by a screen, *c*, which prevents any particles of the filtering material from being drawn out of the chamber.

F is a try-cock to ascertain the height of the water in the filter, and to enable the attendant to regulate the amount of feed-water to admit to the heater, and thence to the filter. It may also be used as an overflow-cock.

G is a drain-cock at the bottom of the filter, to draw off its fluid contents when desired.

If desired, the induction may enter the filter through its cover or top, which otherwise may be removed to give access to its interior, for convenience in filling with or removing the filtering material.

It will readily be seen that by the downward and upward flow of the water through the filtering material, the water being subjected to the action of two separate filters, a more perfect elimination of the earthy matters must result, while the passage through the chamber below the filters facilitates the deposit therein of any sediment carried with it from the first filter.

What I claim as my invention, and desire to secure by Letters Patent, is—

The case A, provided with grating B, partition C, induction-pipe D, eduction-pipe E, strainer *c*, cocks F and G, and hand-holes *a* and *b*, the chambers being filled with a filtering material, and the whole arranged and operating in the manner and for the purpose specified.

JAMES S. HOOTON.

Witnesses:
S. C. LANCASTER,
NOAH WILTHOUS,
FRANCIS D. WARNER.